No. 715,366. Patented Dec. 9, 1902.
J. GAYLEY.
METHOD OF DRYING AIR FOR BLAST FURNACES.
(Application filed Dec. 29, 1898.)
(No Model.)

WITNESSES

INVENTOR
James Gayley

UNITED STATES PATENT OFFICE.

JAMES GAYLEY, OF PITTSBURG, PENNSYLVANIA.

METHOD OF DRYING AIR FOR BLAST-FURNACES.

SPECIFICATION forming part of Letters Patent No. 715,366, dated December 9, 1902.

Application filed December 29, 1898. Serial No. 700,622. (No model.)

*To all whom it may concern:*

Be it known that I, JAMES GAYLEY, of Pittsburg, in the county of Allegheny and State of Pennsylvania, have invented a new and useful Improvement in Methods of Extracting Moisture from Air, of which the following is a full, clear, and exact description, reference being had to the accompanying drawings, forming part of this specification, in which—

Figure 3:
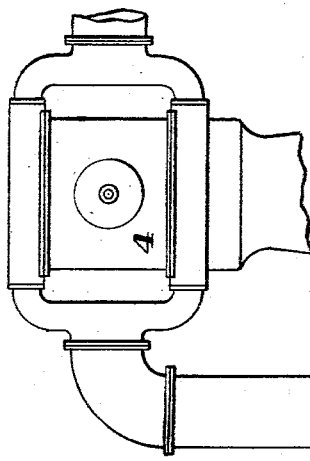
Figure 3:
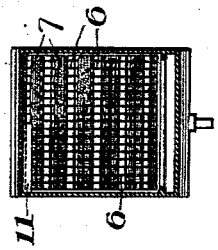
Figure 2:
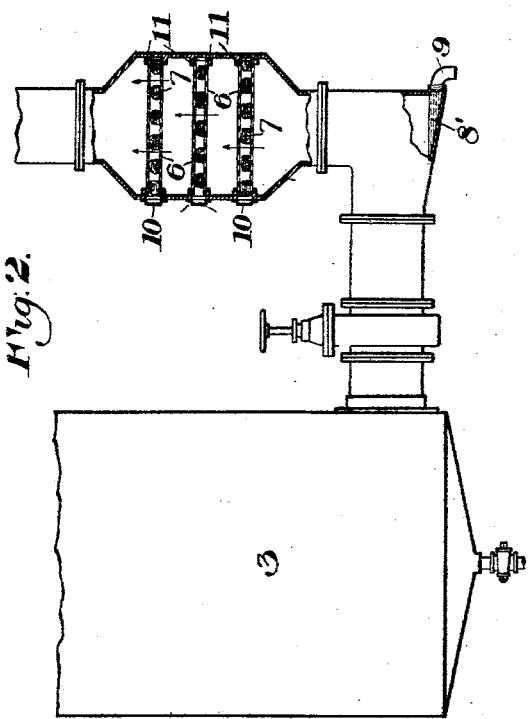
Figure 1:
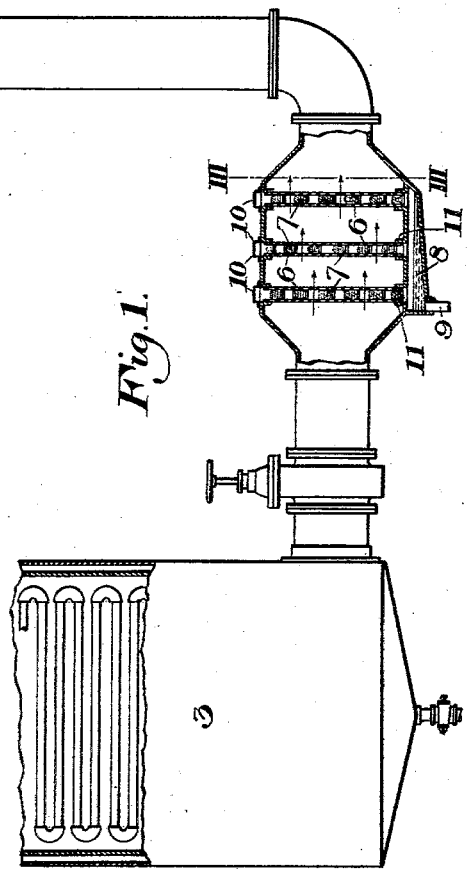

Figure 1 shows in side elevation apparatus of my invention adapted for the practice of my method, and Fig. 2 is a modification of the construction thereof. Fig. 3 is a cross-section on line III III of Fig. 1, showing one screen partly broken away.

In the extraction of the moisture from air by means of refrigerating-surfaces interposed in the passage of air-currents it is found in practice that after a larger percentage of the moisture is removed the remainder is held very tenaciously, and as the pipes are frosted more or less the contact between the air and pipes is not so intimate and the temperature not so low as to permit of a ready extraction of the small percentage remaining. With a large exposure of refrigerating-surface cooled to a very low temperature a practically complete elimination of the moisture can be had; but this can only be done at a material increase in cost of apparatus and refrigerant. I have therefore devised a method by which this smaller percentage of moisture can be reduced to a point of practical elimination in a way that is very economical, and I thereby widen the application of dry air in the arts.

My invention consists in a method of applying to the air at a point in its flow through the conduit connecting the refrigerating-chamber to the blast engine or engines of a blast-furnace plant a moisture-absorbing fluid or material which will extract and retain the moisture in the air. Various materials can be utilized for this purpose; but I prefer in the practice of my invention to apply the chlorid of calcium in the form of a salt. This is preferably placed between two pieces of screen to hold it in proper position, said screens being interposed in the air-conduit leading from the refrigerating-chamber to the air-cylinder of the engine.

In the drawings, 3 represents a refrigerating-chamber of suitable construction in which the air comes in contact with cooled surfaces.
4 represents the air-cylinder of an air-pumping engine, and 5 is a conduit connecting the refrigerating-chamber and air-cylinder, said conduit being preferably widened to such degree that there shall be ample space for the flow of air. 6 6 are perforated trays or screens in said conduit, containing layers of chlorid of calcium 7 7.

8 is a receptacle in the bottom of the conduit for collecting the saturated or liquefied chlorid of calcium after it has become hydrated, and 9 is an opening for drawing off the liquid chlorid of calcium, which can be dehydrated and used again.

10 10 are lids covering openings in the conduit which are used to insert or remove the screens.

11 11 are lugs for holding the trays in position.

In Fig. 2 I have shown a modified construction wherein the screens are placed horizontally. In this case the chlorid of calcium when hydrated collects in the pocket 8'. The hydrated chlorid also falls through the air-currents in passing to said receptacle and does not have a tendency to clog the lower portion of the screen, as in Fig. 1. I am thus enabled to reduce the moisture in the air to an exceedingly low point and at much less expense than where the extraction is performed solely by the employment of refrigerating-surfaces or by the use of chemicals alone.

I do not confine the method claims of this patent to the use of any number of screens containing chlorid of calcium, nor to the described manner of using it, nor to the use of chlorid of calcium alone, as there are other substances that may be used for this purpose. As nearly all such air-drying substances affect metals more or less by corrosion, I may substitute wood, glass, or other substances at such places as come in contact therewith.

In the practice of my invention the air first passes through the chamber 3, wherein are cooled surfaces, and is preferably reduced to 0° centigrade, whereby the greater portion of the moisture is condensed and collected. Thence the air passes into the conduit 5 and passing over the chlorid of calcium or other dehydrating material the moisture that remains is practically eliminated or reduced to a small and practically uniform content. From the conduit or chamber 5 the dried air passes to a blast-furnace or converter. The air engine or pump by which the air is caused to flow may be stationed back of the chambers 3, so as to deliver the air into the latter, or may be placed, as shown in the drawings, in advance of the chamber 5, so as to suck the air through the chambers 3 and 5 to deliver it under compression to the place of use.

I claim—

The method hereinbefore described of drying air for blast-furnace use, which consists in precipitating the greater portion of the moisture therefrom by refrigerating the air to zero centigrade, and then in eliminating or substantially eliminating the remainder of the moisture from said air by bringing the cold air into contact with material having an affinity for water.

In testimony whereof I have hereunto set my hand.

JAMES GAYLEY.

Witnesses:
G. I. HOLDSHIP,
H. M. CORWIN.